United States Patent
Egi et al.

(10) Patent No.: US 9,378,167 B2
(45) Date of Patent: Jun. 28, 2016

(54) ENHANCED DATA TRANSFER IN MULTI-CPU SYSTEMS

(71) Applicant: Futurewei Technologies, Inc., Plano, TX (US)

(72) Inventors: Norbert Egi, Santa Clara, CA (US); Guangyu Shi, Cupertino, CA (US); Raju Joshi, Los Altos, CA (US)

(73) Assignee: Futurewei Technologies, Inc., Plano, TX (US)

( * ) Notice: Subject to any disclaimer, the term of this patent is extended or adjusted under 35 U.S.C. 154(b) by 380 days.

(21) Appl. No.: 13/969,899

(22) Filed: Aug. 19, 2013

(65) Prior Publication Data

US 2015/0052267 A1 Feb. 19, 2015

(51) Int. Cl.
*G06F 13/28* (2006.01)
*G06F 13/24* (2006.01)

(52) U.S. Cl.
CPC .............. *G06F 13/28* (2013.01); *G06F 13/24* (2013.01)

(58) Field of Classification Search
None
See application file for complete search history.

(56) References Cited

U.S. PATENT DOCUMENTS

| | | | |
|---|---|---|---|
| 2007/0282967 | A1 | 12/2007 | Fineberg et al. |
| 2008/0219159 | A1 | 9/2008 | Chateau et al. |
| 2011/0153875 | A1 | 6/2011 | Khericha et al. |
| 2011/0289284 | A1* | 11/2011 | Jung ............... G06F 9/544 711/154 |
| 2012/0221813 | A1 | 8/2012 | Inoue |
| 2014/0068134 | A1 | 3/2014 | Sun |

FOREIGN PATENT DOCUMENTS

CN 102866971 A 1/2013

OTHER PUBLICATIONS

Foreign Communication From A Counterpart Application, PCT Application No. PCT/CN2014/084603, International Search Report dated Dec. 1, 2014, 7 pages.
Foreign Communication From A Counterpart Application, PCT Application No. PCT/CN2014/084603, Written Opinion dated Dec. 1, 2014, 4 pages.

* cited by examiner

*Primary Examiner* — Idriss N Alrobaye
*Assistant Examiner* — Dayton Lewis-Taylor
(74) *Attorney, Agent, or Firm* — Conley Rose, P.C.; Grant Rodolph; Adam J. Stegge

(57) ABSTRACT

A method implemented in a memory device, wherein the memory device comprises a first memory and a second memory, the method comprising receiving a direct memory access (DMA) write request from a first central processing unit (CPU) in a first computing system, wherein the DMA write request is for a plurality of bytes of data, in response to the DMA write request receiving the plurality of bytes of data from a memory in the first computing system without processing by the first CPU, and storing the plurality of bytes of data in the first memory, and upon completion of the storing, sending an interrupt message to a second CPU in a second computing system, wherein the interrupt message is configured to interrupt processing of the second CPU and initiate transfer of the plurality of bytes of data to a memory in the second computing system.

18 Claims, 4 Drawing Sheets

ENHANCED DATA TRANSFER IN MULTI-CPU SYSTEMS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Computer clusters may be employed for a myriad of tasks from performing operations simultaneously to conducting complex computations. A computer cluster may comprise a group of loosely or tightly coupled central processing units (CPUs) which may operate as a single system. For example, a loosely coupled system may be two or more CPUs on independent servers with a loose form of interconnection in between components. A tightly coupled system may be a symmetric multi-processing (SMP) system with an interconnection such as QuickPath Interconnect (QPI) or HyperTransport (HT). Multiple CPUs may be connected on a single disk or via a network in a data center.

In multi-CPU systems without coherent shared memory, it may be desirable to share large data segments between applications running on separate CPUs. Conventional data transfer in multi-CPU systems may be conducted by direct communication between CPUs; however, this approach may be limited by the amount of data that may be sent in a message between processing units as well as the transfer speed. A centralized server may be utilized to store large amounts of data during transfer; however, there may be an increase in complexity in navigating through different protocols to store on devices such as solid-state drives (SSD), which have relatively slow write times. Additionally, there may be a large overhead and high latency in these inter-CPU communication methods.

SUMMARY

In one embodiment, the disclosure includes a method implemented in a memory device, wherein the memory device comprises a first memory and a second memory, the method comprising receiving a direct memory access (DMA) write request from a first central processing unit (CPU) in a first computing system, wherein the DMA write request is for a plurality of bytes of data, in response to the DMA write request receiving the plurality of bytes of data from a memory in the first computing system without processing by the first CPU, and storing the plurality of bytes of data in the first memory, and upon completion of the storing, sending an interrupt message to a second CPU in a second computing system, wherein the interrupt message is configured to interrupt processing of the second CPU and initiate transfer of the plurality of bytes of data to a memory in the second computing system.

In another embodiment, the disclosure includes a method implemented in a memory device, wherein the memory device comprises a first memory and a second memory, the method comprising sending an interrupt message to a first CPU in a first computing system, wherein the interrupt message interrupts processing by the first CPU and indicates a plurality of bytes of data are stored in the first memory and intended for the first computing system, and wherein the plurality of bytes of data are from a second computing system comprising a second CPU, performing a DMA copy of the plurality of bytes of data from the second memory to a memory coupled to the first CPU in response to the interrupt message, wherein the first CPU is not occupied by the DMA copy, upon completion of the DMA copy storing a completion indicator to the second memory, wherein the completion indicator indicates that the DMA copy is complete, sending a second interrupt message to the second CPU, wherein the second interrupt is configured to interrupt processing of the second CPU, in response to the second interrupt message, allowing the second CPU to read the completion indicator to determine the status of the DMA copy.

In yet another embodiment, the disclosure includes a memory device comprising a first memory configured to receive a DMA write request from a first CPU in a first computing system, wherein the DMA write request is for a plurality of bytes of data, receive the plurality of bytes from a memory in the first computing system without processing by the first CPU, and store the plurality of bytes in response to the DMA write request, and a controller coupled to the first memory and configured to send an interrupt message to a second CPU in a second computing system, wherein the interrupt message is configured to interrupt processing of the second CPU and initiate transfer of the plurality of bytes of data to a memory in the second computing system.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

It may be beneficial to use a direct memory access (DMA) engine to enable a direct transfer of large quantities of data while a CPU is performing other operations. A significant challenge in implementation may be the need for the development of a simplified cross-CPU interruption method for efficient data sharing. In order to further facilitate data transfer in such a system, an intermediate area for temporary data storage may be desired in order to improve upon conventional multi-CPU communication methods.

Disclosed herein are systems, methods, apparatuses and computer program products for data transfer in a multi-CPU system by using expansion memory and a cross-CPU interrupting DMA engine. An expansion memory (EM) input/output (I/O) module may be utilized to share or transfer data segments between different computing systems in a loosely or tightly coupled multi-CPU environment. The EM device may be connected to one or more networks through which CPUs may send data to and receive data from other CPUs. The data transfer between CPUs via the EM device may be conducted by using DMA operations. In conventional DMA methods, a CPU may program a DMA engine to obtain data for itself from an I/O device or a separate CPU. However, a cross-CPU interrupting DMA engine may allow a CPU to initiate DMA for data sharing and terminate the transfer at a different CPU. Additionally, an interrupt mechanism may be used to notify CPUs about any occurring data transfer related events that they may be beneficial to respond to with certain actions. The CPU initiating data transfer may direct a completion interrupt to another CPU in order to simplify the messaging. The data transfer methods and associated architectures may achieve high-speed inter-CPU communication.

Figure 1:
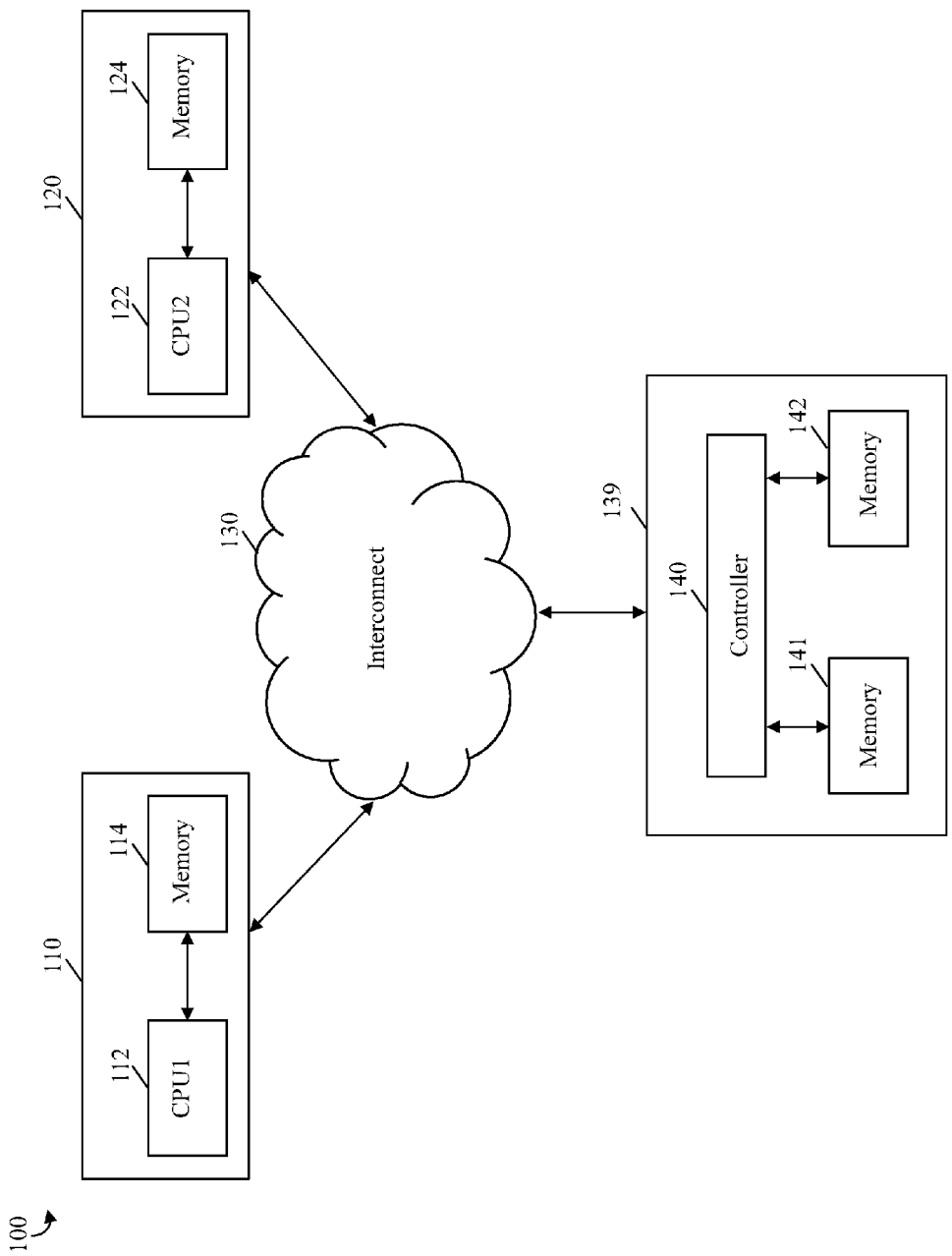
FIG. 1 is a diagram of an embodiment of a multi-CPU system architecture using an expansion memory (EM) device for data transfer.

FIG. 1 is a diagram of an embodiment of a multi-CPU system architecture 100. The architecture 100 may comprise computing systems 110 and 120, an interconnect 130, and an EM device 139 configured as shown (an EM device may sometimes be referred to as an EM module). Although only two computing systems 110 and 120 are shown for illustrative purposes, any number of computing systems may be used in the multi-CPU system. The computing systems 110 and 120 may be tightly or loosely coupled. That is, they may be located on the same server or on separate servers, depending on the realization of the interconnect 130. The computing systems 110 and 120 may each further comprise CPUs 112 and 122 and associated memories (sometimes referred to as memory devices or memory modules) 114 and 124, respectively. The CPUs 112 and 122 may communicate with the memories 114 and 124 via a direct connection, as each computing system (110 and 120) may be located on a single server. Computing systems 110 and 120 may be directly connected, and they may not necessarily have to communicate through the EM device 139. For example, control messages may be sent directly between the two CPUs 112 and 122 over the interconnect 130.

The memories 114 and 124 may be dynamic random-access memory (DRAM) or a cache, which may be used to store volatile data and perhaps store instructions. Memories 114 and 124 may essentially be the destination of a DMA operation during data transfer. The interconnect 130 may be a DMA and interrupt capable interconnect, such as a bus or a switched network or any other suitable topology. The interconnect 130 may employ any type of communication medium, such as electrical, optical, wireless, or any combination thereof. The multi-CPU system may be interconnected in any manner, including but not limited to a star or mesh topology. The multi-CPU system may be built upon any interconnection technology that supports DMA transfer and interrupt messaging, wherein all CPUs and I/O devices communicate to each other over the interconnection network.

The EM device 139 may comprise a controller 140, a first memory 141, and a second memory 142. The controller 140 may be an I/O controller that may interface with the interconnect 130 and move data from the interconnect 130 to the associated memories 141 and 142. The controller 140 may be implemented as one or more CPU chips, cores (e.g., a multi-core processor), field-programmable gate arrays (FPGAs), application specific integrated circuits (ASICs), and/or digital signal processors (DSPs). The EM device 139 may comprise a relatively small, fast memory area in the first memory 141 to store metadata, as well as up to terabytes of storage space in the second memory 142. Memory 141 may be static random-access memory (SRAM), such as double-data rate (DDR) SRAM, which may be employed as a memory cache to store metadata. This area may be a cache storing metadata as needed for bookkeeping, in order to monitor data transfers and data storage on the EM device 139. Memory 142 may be a second memory used in storing large amounts of data, such as a DRAM. Controller 140 may communicate directly with the memories 141 and 142 without the interconnect 130. The controller 140 and memories 141 and 142 may be implemented on the same printed circuited board (PCB).

Figure 2:
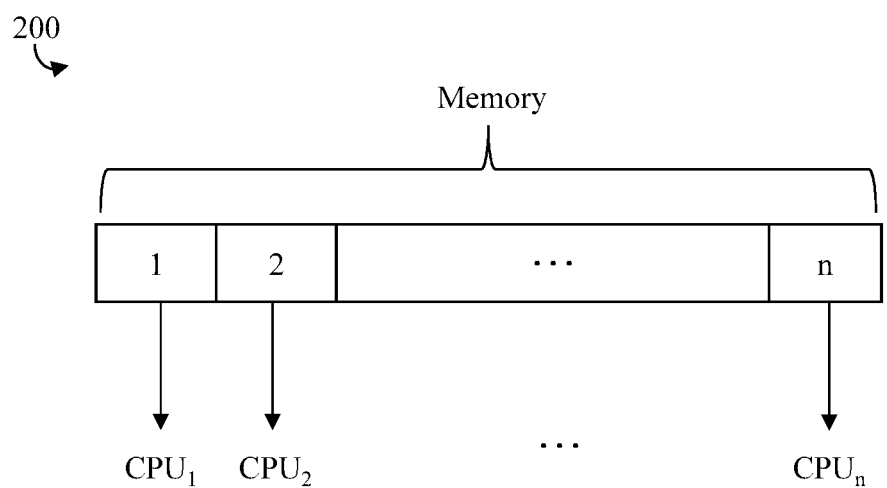
FIG. 2 illustrates a diagram of an embodiment of CPU memory allocation.

Memory 141 may be divided into a plurality of segments, which may each be assigned to a CPU. FIG. 2 illustrates a diagram of an embodiment of CPU memory allocation. The diagram 200 comprises a memory divided into n segments, wherein segments 1, 2 . . . , n are each assigned to corresponding $CPU_1$, $CPU_2$, . . ., $CPU_n$. An assigned CPU may be the only CPU allowed to write to the assigned segment, while other CPUs may only read from the assigned segment. For example, $CPU_1$ may write to memory segment 1, while $CPU_{2...n}$ may only read from segment 1. The entries in the n memory segments may be used to communicate parameters of the data to be transferred, such as address and length. Although the memory segments are shown as consecutive segments in FIG. 2 for illustrative purposes, they are not necessarily required to be assigned in a particular order. The memory segments may be non-contiguous memory and allocated for different CPUs in any manner. The CPUs may also be arranged in any order and assigned to varying segments in the memory.

Figure 3:
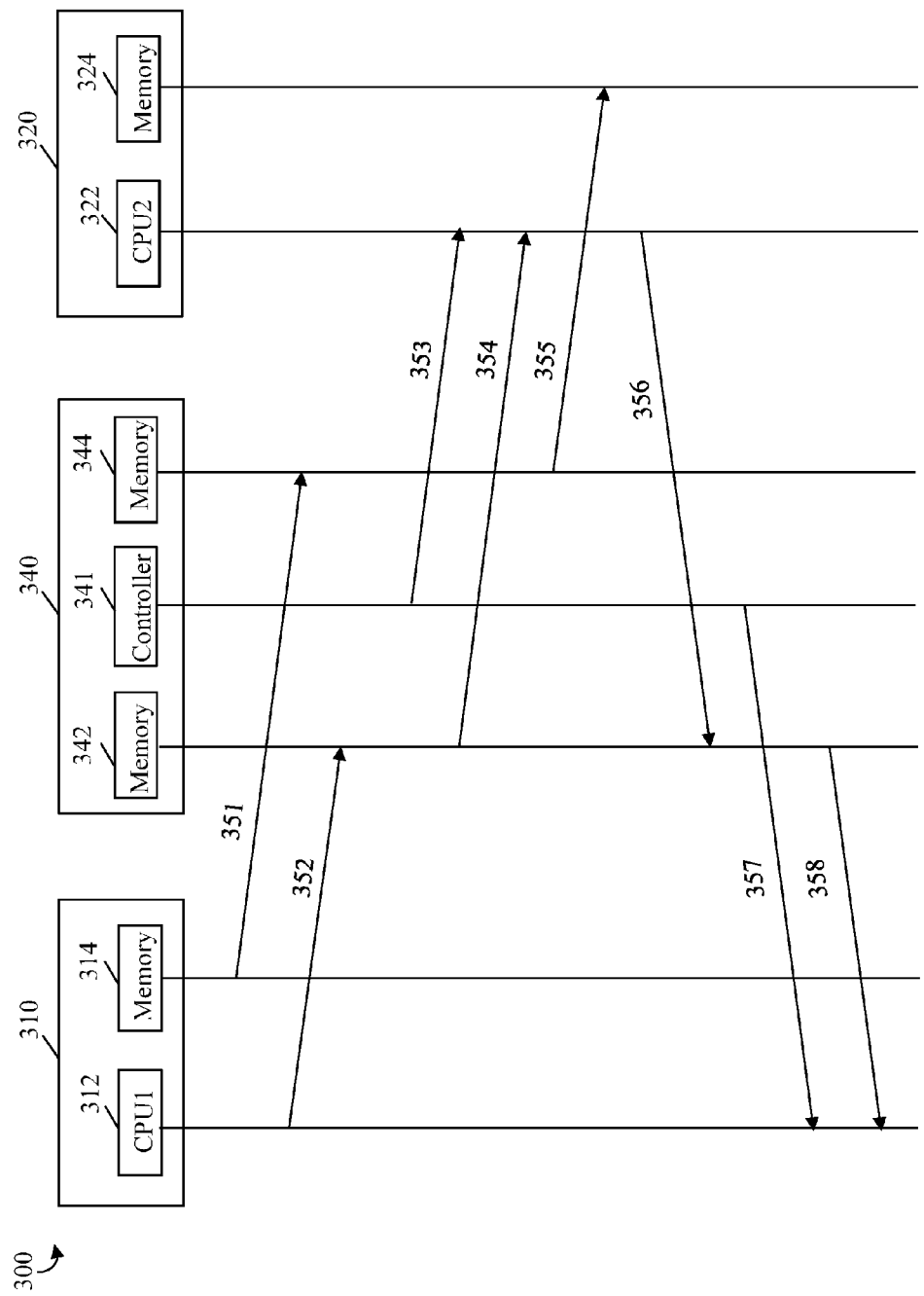
FIG. 3 is a protocol diagram illustrating an embodiment of signaling between two computing systems and an EM device.

FIG. 3 is a protocol diagram 300 illustrating an embodiment of signaling between two computing systems 310 and 320 and an EM device 340. The computing systems 310 and 320 may be the same as the computing systems 110 and 120, respectively. The computing systems 310 and 320 may comprise CPU1 312 and CPU2 322, as well as memory 314 and memory 324, respectively. Specifically, the protocol diagram 300 depicts the communication between the computing system components and the EM device components. The EM device 340 may comprise a controller 341, a memory 342, and a memory 344. The components in diagram 300 may be implemented in a multi-CPU system architecture such as system 100, where components such as computing systems 110, 120, interconnect 130, and EM device 139 may be employed. The computing systems 310 and 320 and the EM device 340 may be coupled through an interconnect, such as interconnect 130. Although not illustrated in FIG. 3, it is understood by a person of ordinary skill in the art that the computing systems 310 and 320 and the EM device 340 each may comprise a corresponding transceiver through which the components of the computing systems 310, 320 (e.g., the memories 314, 324 and CPUs 312 and 322) and the EM device 340 (e.g., the controller 341 and memories 342, 344) may communicate with one another. The computing systems 110 and 120 and EM device 139 may similarly employ transceivers.

Suppose an application running on CPU1 312 wants to send a message or data of N bytes to an application running on CPU2 322 in a multi-CPU system. The size N of the data to be transferred may be several gigabytes as an example. In order to demonstrate the data transfer mechanism, the following notations in Table 1 may be used.

TABLE 1

An example of address notations in multi-CPU system.

| Address | Notation |
| --- | --- |
| Source CPU1 address | CPU1_START |
| EM start address | EM1_START |
| Destination CPU2 address | CPU2_START |

The sequence of events for data transfer in diagram 300 may commence at step 351, wherein the computing system 310 may have N bytes of data starting at the CPU1_START address. The N bytes of data may be one continuous space or scattered non-contiguous segments. Computing system 310 may build a scatter-gather list, which may comprise a list of elements with physical addresses and lengths, indicating regions of memory from which data should be transferred. The scatter-gather list may be a road map to continuous or non-contiguous segments of memory, such as the segments depicted in diagram 200.

The computing system 310 may send a message from the memory 314 to the memory 344 in the EM device 340 to copy the data stored in the locations on the scatter-gather list to the address EM1_START. Computing system 310 and/or EM device 340 may comprise a DMA engine in order to transfer data from the memory 314 to 344. A DMA engine may be a logic unit or processor that facilitates memory operations and is separate from an associated CPU in order to free processing resources of the CPU from being occupied with memory operations. For example, a DMA engine in computing system 310 may be a logic unit or processor that exists separately from CPU1 312. Further, the DMA engine may be located at an I/O device (e.g., in computing system 310). A DMA data transfer (or copy or write operation) from memory 314 to memory 344 may occur while allowing the CPU1 312 to accomplish other tasks during the data transfer. In other words, the CPU1 312 is not occupied or does not have to use processing resources devoted to the data transfer once it begins. This is an advantage of DMA operations. In step 352, CPU1 312 may write information about the N bytes to the corresponding memory segment at memory 342, wherein the EM start address may be EM1_START. Memory 342 may be SRAM or a cache used to store information, including metadata such as the destination CPU2_START address and the length of the data to be stored (e.g., in units of bytes, which is N bytes in this case). The first two steps may enable DMA, wherein the EM device 340 may independently access the N bytes of data to be transferred from computing system 310. Upon DMA completion, the controller 341 in EM device 340 may send an interrupt or interrupt message (e.g., an Message Signaled Interrupt (MSI) or MSI-X interrupt) in step 353 to CPU2 322 in computing system 320. The interrupt may notify CPU2 322 where to locate the metadata about the data destined to the particular CPU. Once it has received the interrupt, the CPU2 322 may read the memory segment addressed in the interrupt message in step 354 in order to obtain information about the data (e.g., EM1_START address and message length).

In step 355, the computing system 320 may set up a DMA copy to copy the N bytes of data beginning at EM1_START to the address CPU2_START in memory 324. The DMA data transfer (or copy or write operation) may occur while allowing the CPU2 322 to accomplish other tasks during the data transfer. In other words, the CPU1 312 is not occupied or does not have to use processing resources devoted to the data transfer once it begins. In step 356, CPU2 322 may write a completion indicator (i.e., metadata) to its assigned memory segment in memory 342 for the destination address CPU1_START. Upon DMA completion, the EM device controller 341 may send an interrupt (e.g., MSI or MSI-X interrupt) in step 357 to CPU1 312 with the address of the metadata in the memory segment in memory 342. After receiving the interrupt, CPU1 312 may read the metadata in the memory segment to obtain the completion status in step 358. If the transfer has been completed successfully, CPU1 312 may re-use the CPU1_START address from additional data sharing with CPU2 322 or another CPU in the system.

Computing systems 310 and 320 may be directly connected and may not necessarily require communication through the EM device 340. For example, steps 352, 354, 356, and 358 may be control messages that are sent between systems 310 and 320 over a direct connection, such as interconnect 130. These messages may optionally be sent over the interconnect directly from one computing system to another computing system without sending the messages using the EM device 340.

Figure 4:
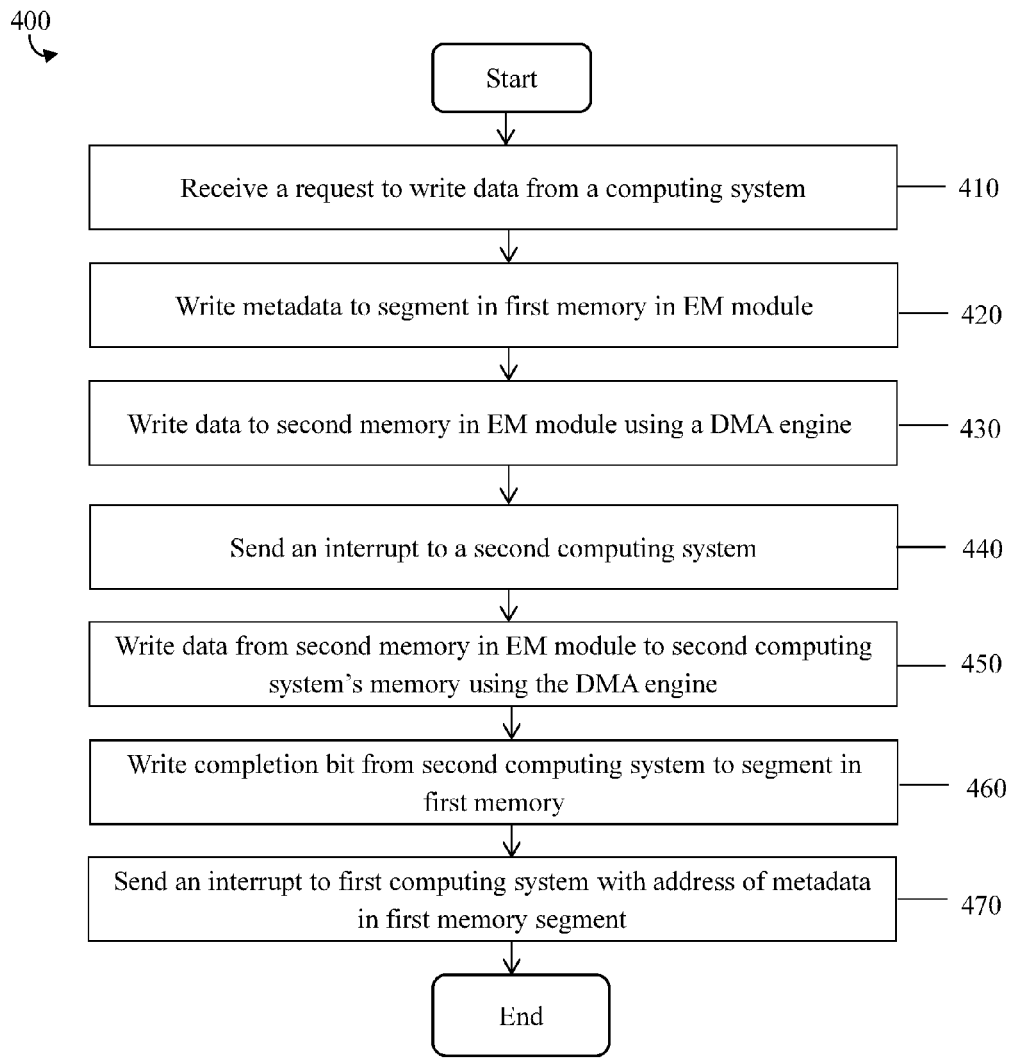
FIG. 4 is a flowchart of an embodiment of a data transfer method in a multi-CPU system.

FIG. 4 is a flowchart 400 of an embodiment of a data transfer method. The steps of the flowchart 400 may be implemented in an interconnected multi-CPU system, with at least two computing systems and an EM device, such as computing systems 110 and 120, and EM device 139, and/or computing systems 310, 320 and EM device 340. The steps may be performed in an EM device, such as EM device 139 and/or EM device 340.

The flowchart begins in block 410 in which an EM device (e.g., EM device 139) may receive a request from a computing system such as computing system 110 to write data. The request may comprise a scatter-gather list with a compilation of physical addresses and lengths, indicating the data and memory locations from which the data should be transferred. In block 420, the EM device may write the metadata from the first computing system's source address to its assigned segment in the first memory. The EM device may comprise two memories (e.g., memory 141 and memory 142), wherein the first memory may be a SRAM or cache storing memory data and the second memory may be a memory storing large amounts of data. In block 430, the EM device may write data from the first computing system to the second memory using a DMA engine. The method may continue in block 440, wherein the EM device may send an interrupt to a second computing system (e.g., computing system 120). The interrupt message may allow the second computing system to locate and read the metadata about the data to be transferred from the first computing system. In block 450, the EM device may write the data from its second memory to the second computing system's memory using the DMA engine. Next in block 460, the EM device may write a completion bit from the second computing system to the assigned segment in the first memory. In block 470, the EM device may send an interrupt to the first computing system with the address of the metadata in the first memory segment. From this metadata, the EM device may allow the computing system to read the completion bit and determine whether or not data transfer was successfully completed.

It is understood that by programming and/or loading executable instructions onto an EM device, such as EM device 139 or EM device 340, at least one of the controller, the first memory, and the second memory are changed, transforming the EM device in part into a particular machine or apparatus, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method implemented in a memory device, wherein the memory device comprises a first memory and a second memory, the method comprising:
   receiving a direct memory access (DMA) write request from a first central processing unit (CPU) in a first computing system, wherein the DMA write request is for a plurality of bytes of data;
   in response to the DMA write request:
   receiving the plurality of bytes of data from a memory in the first computing system without processing by the first CPU; and
   storing the plurality of bytes of data in the first memory; and
   sending, upon completion of the storing, an interrupt message to a second CPU in a second computing system, wherein the interrupt message is configured to interrupt processing of the second CPU and initiate transfer of the plurality of bytes of data to a memory in the second computing system,
   wherein the second memory is divided into at least two segments comprising a first segment and a second segment, wherein the first segment is assigned to the first computing system and the second segment is assigned to the second computing system for writing metadata regarding data transfer to the corresponding segment, and wherein either of the first and second computing systems are allowed to read from either segment.

2. The method of claim 1, wherein further in response to the DMA write request:
   receiving metadata from the first CPU, wherein the metadata includes a length of the plurality of bytes of data; and
   writing the metadata in the second memory,
   wherein the metadata begins at a first address of the second memory, and wherein the interrupt message comprises the first address.

3. The method of claim 2, further comprising:
   reading the metadata, by the second computing system, starting at the first address; and
   performing a DMA copy of the plurality of bytes of data from the first memory to the memory in the second computing system in response to the interrupt message, wherein the second CPU is not occupied by the DMA copy.

4. The method of claim 3, wherein upon completion of the DMA copy, the method further comprises:
storing a completion indicator to the second memory, wherein the completion indicator indicates that the DMA copy is complete;
sending a second interrupt message to the first CPU, wherein the second interrupt message is configured to interrupt processing of the first CPU; and
allowing, in response to the second interrupt message, the first CPU to read the completion indicator from the second memory to determine a status of the DMA copy.

5. The method of claim 4, wherein the interrupt message and the second interrupt message are of a type Message Signaled Interrupt (MSI).

6. The method of claim 1, wherein the metadata is stored in the first segment, and wherein a completion indicator, indicating that a DMA copy is completed, is stored in the second segment.

7. The method of claim 2, further comprising reading, by the memory device upon completion of the storing, the metadata to determine an identifier of the second CPU, wherein the metadata further includes the identifier of the second CPU.

8. A method implemented in a memory device, wherein the memory device comprises a first memory and a second memory, the method comprising:
sending an interrupt message to a first central processing unit (CPU) in a first computing system, wherein the interrupt message interrupts processing by the first CPU and indicates a plurality of bytes of data are stored in the first memory and intended for the first computing system, and wherein the plurality of bytes of data are from a second computing system comprising a second CPU;
performing a direct memory access (DMA) copy of the plurality of bytes of data from the second memory to a memory coupled to the first CPU in response to the interrupt message, wherein the first CPU is not occupied by the DMA copy;
storing, upon completion of the DMA copy, a completion indicator to the second memory, wherein the completion indicator indicates that the DMA copy is complete;
sending a second interrupt message to the second CPU, wherein the second interrupt message is configured to interrupt processing of the second CPU; and
allowing, in response to the second interrupt message, the second CPU to read the completion indicator to determine a status of the DMA copy.

9. The method of claim 8, further comprising:
receiving a DMA write request from the second CPU, wherein the DMA write request is for the plurality of bytes of data;
in response to the DMA write request:
receiving the plurality of bytes of data from a memory in the second computing system without processing by the second CPU; and
storing the plurality of bytes of data in the first memory.

10. The method of claim 8, wherein the interrupt message comprises a first address of the second memory, wherein metadata regarding the plurality of bytes of data is stored starting at the first address, wherein the metadata comprises a length of the plurality of bytes of data and an address in the first memory where the plurality of bytes of data is stored, and wherein the first CPU reads the metadata starting at the first address prior to performing the DMA copy.

11. A memory device comprising:
a first memory configured to:
receive a direct memory access (DMA) write request from a first central processing unit (CPU) in a first computing system, wherein the DMA write request is for a plurality of bytes of data;
receive the plurality of bytes of data from a memory in the first computing system without processing by the first CPU;
store the plurality of bytes of data in response to the DMA write request; and
perform a DMA copy of the plurality of bytes of data to the memory in a second computing system in response to an interrupt message, wherein a second CPU in the second computing system is not occupied by the DMA copy; and
a controller coupled to the first memory and configured to send the interrupt message to the second CPU in the second computing system, wherein the interrupt message is configured to interrupt processing of the second CPU and initiate transfer of the plurality of bytes of data to a memory in the second computing system.

12. The memory device of claim 11, further comprising a second memory configured to:
receive metadata from the first CPU regarding the plurality of bytes of data; and
store the metadata, wherein the metadata begins at a first address of the second memory, and wherein the interrupt message comprises the first address.

13. The memory device of claim 12, wherein the metadata further includes an identifier of the second CPU, and wherein the controller is further configured to read, upon completion of the storing, the metadata to determine the identifier of the second CPU.

14. The memory device of claim 11, further comprising a second memory configured to, upon completion of the DMA copy, store a completion indicator, wherein the completion indicator indicates that the DMA copy is complete, wherein the controller is further configured to send a second interrupt message to the first CPU, and wherein the second interrupt message is configured to interrupt processing of the first CPU, and in response to the second interrupt message, allow the first CPU to read the completion indicator from the second memory to determine a status of the DMA copy.

15. The memory device of claim 14, wherein the interrupt message and the second interrupt message are of a type Message Signaled Interrupt (MSI).

16. The memory device of claim 11, further comprising a second memory divided into at least two segments comprising a first segment and a second segment, wherein the first segment is assigned to the first computing system and the second segment is assigned to the second computing system for writing metadata regarding data transfer to the corresponding segment, and wherein either of the first and second computing systems are allowed to read from either segment.

17. The memory device of claim 16, wherein the metadata is stored in the first segment, and wherein a completion indicator, indicating that the DMA copy is completed, is stored in the second segment.

18. The memory device of claim 11, wherein the plurality of bytes of data are stored scattered non-contiguous segments, wherein each segment corresponds to a start address and a length, and wherein the start addresses and lengths are stored in the first memory.

* * * * *